United States Patent [19]
Dare-Bryan

[11] Patent Number: 5,094,503
[45] Date of Patent: Mar. 10, 1992

[54] VEHICLE AERODYNAMICS

[76] Inventor: Valerian J. Dare-Bryan, c/o Ricardo A.S. & A. Limited, Unit 25, The Business Centre, Avenue One, Letchworth, Hertfordshire, England, SG6 2HB

[21] Appl. No.: 576,525

[22] PCT Filed: Feb. 2, 1990

[86] PCT No.: PCT/GB90/00210
§ 371 Date: Oct. 5, 1990
§ 102(e) Date: Oct. 5, 1990

[87] PCT Pub. No.: WO90/09303
PCT Pub. Date: Aug. 23, 1990

[30] Foreign Application Priority Data
Feb. 7, 1989 [GB] United Kingdom ............... 8902640

[51] Int. Cl.$^5$ .................................................. B62D 35/00
[52] U.S. Cl. ............................... 296/180.1; 296/180.2; 105/1.1
[58] Field of Search ............... 296/180.1, 180.2, 180.4, 296/91; 105/1.1, 1.2

[56] References Cited

U.S. PATENT DOCUMENTS

| | | | |
|---|---|---|---|
| 827,899 | 8/1906 | Zimmerman | 105/1.2 X |
| 2,182,640 | 12/1939 | Pohlhausen | 105/1.2 |
| 2,208,075 | 7/1940 | Jabelmann | 105/1.2 |
| 2,243,906 | 6/1941 | Huet | 105/1.1 |
| 3,999,797 | 12/1976 | Kirsch et al. | 296/180.4 |
| 4,057,280 | 11/1977 | MacCready, Jr. et al. | 105/1.1 X |
| 4,508,380 | 4/1985 | Sankrithi | 296/180.4 |
| 4,553,782 | 3/1985 | Markland | 296/1 S |
| 4,682,808 | 7/1987 | Bilanin | 296/91 X |
| 4,738,203 | 4/1988 | Gielow et al. | 105/1.1 |
| 4,789,117 | 12/1988 | Paterson et al. | 296/180.4 X |
| 4,867,397 | 9/1989 | Pamadi et al. | 296/180.4 X |

FOREIGN PATENT DOCUMENTS

| | | |
|---|---|---|
| 0266893 | 5/1988 | European Pat. Off. . |
| 3202812A1 | 1/1982 | Fed. Rep. of Germany . |
| 160103 | 5/1983 | Fed. Rep. of Germany ... 296/180.4 |
| 3202812 | 8/1983 | Fed. Rep. of Germany ... 296/180.2 |
| 805960 | 12/1936 | France .................................. 105/1.1 |
| 876146 | 10/1942 | France .............................. 296/180.1 |
| 2366980 | 10/1976 | France . |

OTHER PUBLICATIONS

"Industry and Technology" Automotive Engineer 13 (1988) Dec. No. 6, Bury St. Edmunds, Suffolk, Gr. Britain.

Primary Examiner—Johnny D. Cherry
Assistant Examiner—Joseph D. Pape
Attorney, Agent, or Firm—Nixon & Vanderhye

[57] ABSTRACT

A vehicle comprising in combination a towing vehicle and a trailer vehicle, with each vehicle having a body of generally rectangular shape in vertical section. The bodies each have upright sides and a roof, the roof of each of the bodies having an upwardly facing upper surface for the most part lying horizontally in the direction of travel of the vehicle. The towing vehicle body has a profiling device located at the rear of the body and defining a roof surface which slopes downwards towards the rear. The trailer vehicle body is also provided with a profiling device at the forward end of the body and defining a roof surface of the trailer vehicle body which slopes upwards towards the rear. Side ridges are arranged to each side of the sloping surfaces of the towing and trailer body profiling devices, with the ridges extending above the level of the sloping surfaces. In this way, the upper surfaces of the bodies provide successively a horizontal surface, a downwardly sloping surface, an upwardly sloping surface and a horizontal surface over which surfaces the air flows during passage of the vehicle, the sloping surfaces being bounded laterally by the side ridges.

7 Claims, 1 Drawing Sheet

U.S. Patent    Mar. 10, 1992    5,094,503

VEHICLE AERODYNAMICS

This invention relates to vehicle aerodynamics and in particular but not exclusively to the aerodynamics of vehicle/trailer combinations.

BACKGROUND OF THE INVENTION

Goods vehicles commonly include a box-like body to the rear of the cab and such vehicles are often employed to tow as a trailer a further unit also fitted with a box-like body.

It is an object of the invention to provide means whereby the aerodynamic qualities of vehicles and vehicle/trailer combinations can be improved.

SUMMARY OF THE INVENTION

According to one aspect of the invention a vehicle comprises a box-like body comprising an upper surface and upright side surfaces, the upper surface lying for the most part horizontally and having profiling means towards its rear end, the profiling means including a downwardly rearwardly inclined surface extending to the rear of the box-like body.

Preferably the profiling means includes ridges to the sides of the inclined surface which extend upwards above the level of the surface, the upper edges of the ridges lying generally horizontally.

Conveniently the profiling means includes a small ridge extending upwardly above said upper surface adjacent the leading portion of the inclined surface and transversely of the direction of travel.

In one arrangement the inclined surface lies at an angle in the range 5°-10° to the horizontal.

The junction between the upright side surfaces of the body and a rear surface of the body may be defined by a curvilinear or arcuate surface and an arcuate curvilinear surface may define the junction between the upper and side surfaces of the body.

According to another aspect of the invention a vehicle comprises in combination a towing and a trailer vehicle each having a box-like body, each of the bodies having an upper surface which is for the most part horizontal, the towing vehicle body having profiling means whereby to the rear of the upper surface said surface is inclined downwardly to the rear, the trailer vehicle having profiling means whereby towards the front of the upper surface of the box-like body of the trailer said surface is inclined upwardly in the rearwards direction.

Preferably the profiling means on each of the towing vehicle and trailer vehicle bodies has ridges to the sides of the respective inclined surfaces which extend upwards above the level of the surfaces.

Conveniently the inclination of the downwardly and upwardly-inclined surfaces to the horizontal is substantially the same for each of the profiling means.

The provision of the profiling means is particularly effective in improving the aerodynamic qualities of the vehicle and trailer combination when the front end of the trailer is relatively closely spaced from the towing vehicle. Preferably the spacing is small and may be as small as 15 cms but the beneficial effects may be obtainable with a wider spacing of up to 2 m.

Further improvements in aerodynamics may also be obtained by profiling means whereby the forward upright edges of the box-like body of the trailer vehicle are radiused to provide a curved leading edge. In addition the rearward upright edges of the box-like body of the trailer vehicle may be profiled to provide a curved trailing edge.

It has been found that by the provision of the profiling means the aerodynamic efficiency of the vehicle/trailer combination is significantly improved partly, it is believed, by ensuring that the creation of eddies of air over the body surfaces is reduced. Instead of such eddies being created air flow over the surfaces is maintained with a smooth flow profile, thereby reducing drag on the vehicle/trailer combination.

Further profiling means may also be provided at the rear end of the trailer upper surface to define a downwardly rearwardly inclined surface.

BRIEF DESCRIPTION OF THE DRAWINGS

Further features of the invention will appear from the following description of an embodiment of the invention given by way of example and with reference to the drawings in which.

DETAILED DESCRIPTION OF THE INVENTION

Figure 1:
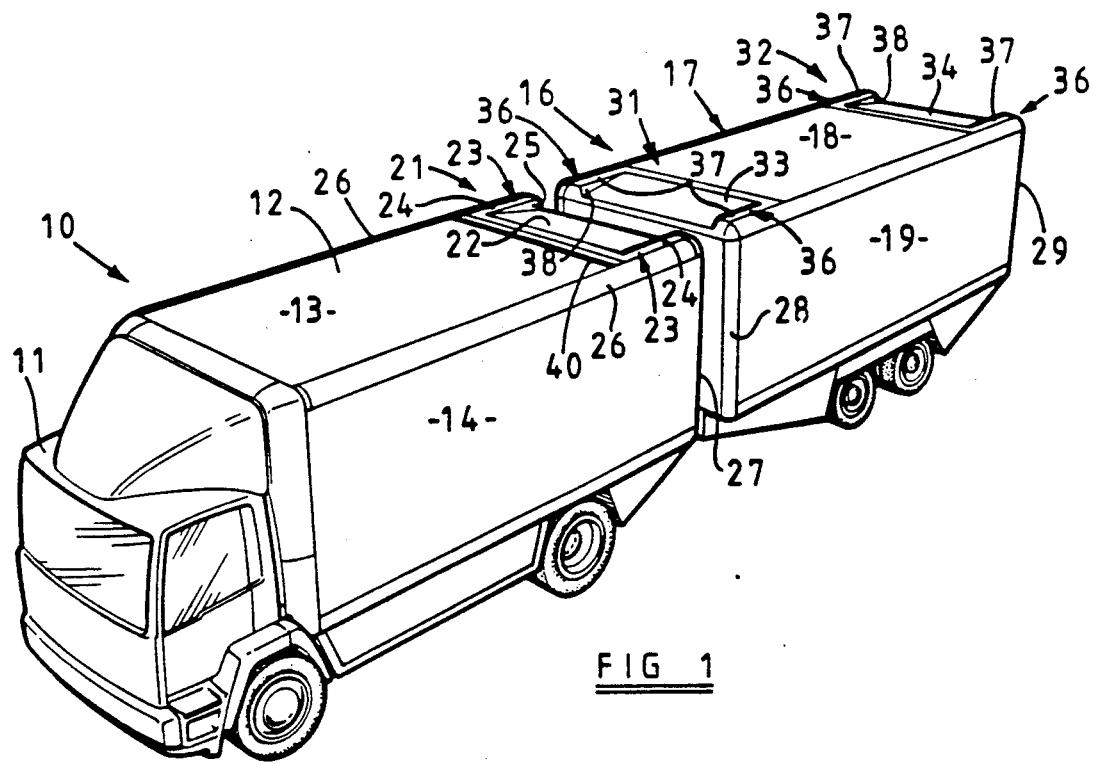
FIG. 1 is a perspective view of a towing vehicle/trailer vehicle combination.
Figure 2:
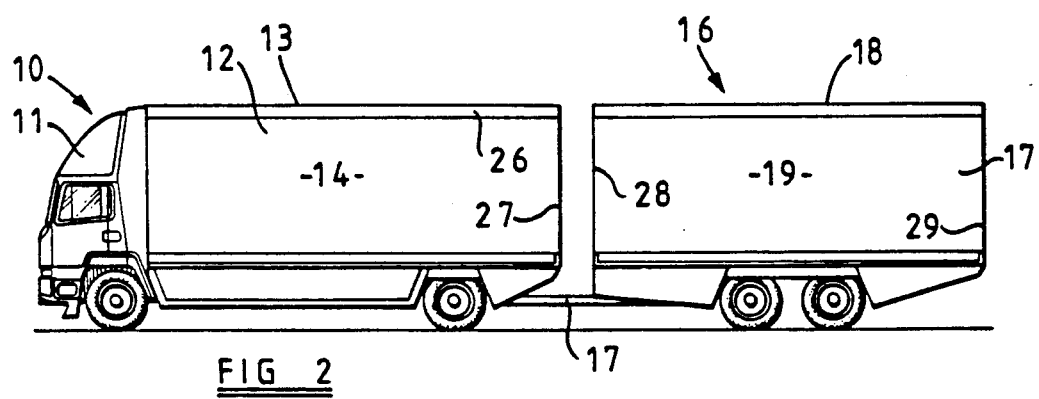
FIG. 2 is a side elevation of the combination shown in FIG. 1.
Figure 2A:
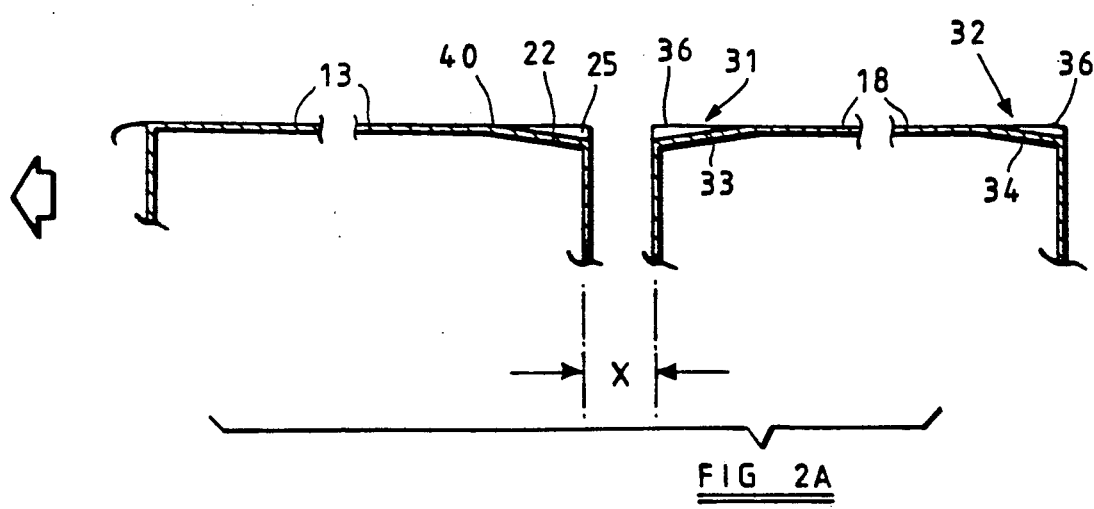
FIG. 2A is a scrap view showing in cross section the roof profile of the combination of FIGS. 1 and 2.

Referring to the drawings a vehicle/trailer combination is shown in which the towing vehicle 10 is provided with a cab 11 at the forward end of the vehicle and a rearwardly located box-like body 12. The cab 11 presents a smaller frontal area than the generally rectangular body 12 and in the manner described and illustrated in European Patent Application 0266893 the cab and body may be provided with means for improving the aerodynamic qualities of the frontal areas of the towing vehicle thereby improving the air flow characteristics in the transition region between the cab and the body. The illustrated vehicle is fitted with such means and accordingly the air flow along an upper surface 13 and along the side surfaces 14 of the body 12, at least over the forward part of the body, takes up an aerodynamically efficient line.

The present invention is concerned primarily with maintaining the good aerodynamic conditions at the rearward end of the towing vehicle and over a trailer vehicle 16 located to the rear of the towing vehicle 10.

The trailer vehicle 16 is towed by the towing vehicle 10 and is attached thereto by a draw bar 17 so that the front end of the trailer is spaced a distance X from the rear end of the body 12 of the vehicle. Various means have been proposed by which the spacing X is maintained, during normal running, at a small amount, there being provision in some cases, for increasing the distance during manoeuvring, such as when turning corners. Such means are not part of the present invention. However the invention has particular application to vehicle/trailer combinations in which the distance X is relatively small and ranges from about 15 cms to about 2 meters.

The trailer 16 has generally the same profile as seen from the ends of the trailer profile over its box-like body 17 as the body 12 of the vehicle 10, that is it has a generally rectangular section with an upper surface 18 and side surfaces 19 aligned with the upper surfaces 13 and the side surfaces 14 respectively of the body 12. Such upper surfaces 13 and 18 are over the most part generally horizontally disposed and planar.

The side surfaces 14 and 19 are generally upright and planar. By maintaining the rectangular configuration of the upper and side surfaces, as described, the interior of the vehicle body 12 and the trailer body 17 is of the desired internal dimensions for the carriage of goods.

The towing vehicle body 12 is modified by the provision of profiling means, to be described, in the region of the transition between the vehicle body 12 and the trailer body 17 to improve the aerodynamic flow of air over both bodies. Profiling means 21 for the upper surface 13 of the body 12 defines a downwardly and rearwardly inclined surface 22 located between laterally spaced ridges 23 which are positioned at the sides of the body 12. The ridges 23 are located one at each of the opposite sides of the body 12 and each have an upper surface 24 generally aligned with the roof surface 13 of the body 12, and upright side surfaces including an inner side surface 25. At their outer sides the ridges 23 each lie adjacent upper side edges 26 of the body 12 which edges 26 are of arcuate or curvilinear section.

The rear upright edges 27 of the body 12 are also formed as arcuate or curvilinear section. Similarly the leading end trailing upright edges 28 and 29 of the trailer body 17 are each formed with arcuate or curvilinear sections.

Profiling means 31 and 32 for the upper surface 18 of the trailer body 17 are also provided for defining an upwardly and rearwardly directed, inclined surface 33 at the forward end and a downwardly and rearwardly directed inclined surface 34 at the rearward end of the body.

In each case the profiling means 31 and 32 take a similar form to the profiling means 21, the profiling means 32 being of a like inclination to the profiling means 21 but the profiling means 31 being of opposite inclination. The angles of inclination to the horizontal may be the same in each case and in the range 5° to 10°. Moreover to the sides of each of the surfaces 33 and 34 are located ridges 36 of a similar form to the ridges 23 of the profiling means 21 having upper surfaces 37 aligned with the respective upper roof surface 18 and inner upright side surfaces 38.

It has been found that by modifying the vehicle body and the trailer body as described, the aerodynamic efficiency of the vehicle/trailer combination is much enhanced. In wind tunnel tests it is seen that whereas without the modifications the air flow over the upper and side surfaces of the combination is uneven and forms eddy currents. In the modified arrangement the flow of air maintains an even flow over such surfaces. The relative absence of uneven flow characteristics shows an improved drag coefficient.

Moreover if the towing vehicle 10 is used without the trailer 16 the profiling means 21 provides enhanced aerodynamic efficiency for the towing vehicle alone.

It is advantageous to provide, somewhat in advance of the profiling means 21 of the vehicle 10, a small ridge 40 extending a few centimetres above the level of the roof surface 13 and transverse to the direction of travel. Such a ridge may have the effect of "reattaching" the air flow nearest said surface 13, that is any tendency for the air flow to move away from the surface 13 is counteracted.

I claim:

1. A vehicle which comprises in combination
   a towing vehicle and a trailer vehicle, each vehicle having a body of generally rectangular shape in vertical section, the bodies of each vehicle having upright sides and a roof, the roof of each of the bodies having an upwardly facing upper surface for the most part lying horizontally in a plane in the direction of travel of the vehicle;
   towing body profiling means for the towing vehicle body, said profiling means being located at the rear of said body and defining a roof surface which slopes downwards from said plane towards the rear;
   trailer body profiling means for the trailer vehicle body located at the forward end of said body and defining a roof surface of the trailer vehicle body which slopes upwards towards the rear and to said plane, and
   side ridges arranged to each side of the sloping surfaces of said towing and trailer body profiling means, said side ridges extending above the level of said sloping surfaces, said upper surfaces of the bodies providing successively a horizontal surface, a downwardly sloping surface, an upwardly sloping surface and a horizontal surface over which surfaces the air flows during passage of the vehicle, the sloping surfaces being bounded laterally by the side ridges.

2. A vehicle according to claim 1 wherein the upper edges of the ridges are located at the level of said horizontal surfaces.

3. A vehicle according to claim 1 comprising further profiling means for the trailer vehicle body located to the rear of said body and defining a roof surface of the trailer vehicle which slopes downwards towards the rear, side ridges being provided to the sides of the downwardly sloping surface of the trailer body.

4. A vehicle according to claim 1 in which the sloping surfaces all lie at an angle of 5-10 degrees to the horizontal.

5. A vehicle according to claim 1 wherein the trailer body is spaced 15 centimeters to 2 meters from the rear end of the towing vehicle body.

6. A vehicle according to claim 1 comprising curvilinear surfaces at the junctions between a front surface and the upright sides of the trailer vehicle body.

7. A vehicle according to claim 1 comprising a ridge extending transverse to the direction of travel on the towing vehicle body and in advance of the profiling means of the towing vehicle body, the ridge extending above the level of said upwardly facing roof surface.

* * * * *